US006856061B2

(12) United States Patent
Nishizawa et al.

(10) Patent No.: US 6,856,061 B2
(45) Date of Patent: Feb. 15, 2005

(54) SYNCHRONOUS RESOLVER, RESOLVER CABLE AND DIRECT DRIVE MOTOR SYSTEM

(75) Inventors: Masatoshi Nishizawa, Gunma (JP); Masaki Kuwahara, Kanagawa (JP); Masamitsu Kamimura, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/291,657

(22) Filed: Nov. 12, 2002

(65) Prior Publication Data

US 2003/0090223 A1 May 15, 2003

(30) Foreign Application Priority Data

Nov. 12, 2001 (JP) .................................... P. 2001-346792
Jan. 15, 2002 (JP) .................................... P. 2002-006411
Jan. 15, 2002 (JP) .................................... P. 2002-006413

(51) Int. Cl.[7] .......................... H02K 19/00; H02K 21/00
(52) U.S. Cl. ..................... 310/162; 310/68 B; 310/194; 310/209
(58) Field of Search ................................ 310/162, 166, 310/68 B, 194, 216, 218, 254, 209; 324/207.13, 207.16–207.18, 207.24, 207.25; 336/130–135; 174/113 R

(56) References Cited

U.S. PATENT DOCUMENTS

| | | | | |
|---|---|---|---|---|
| 4,928,046 A | * | 5/1990 | Karasawa | .................... 318/654 |
| 6,137,204 A | * | 10/2000 | Kuwahara | .................... 310/254 |
| 6,335,582 B1 | * | 1/2002 | Abukawa et al. | ........... 310/214 |
| 6,566,779 B2 | * | 5/2003 | Takano et al. | .............. 310/214 |

FOREIGN PATENT DOCUMENTS

JP 60-226733 * 11/1985 ................. 310/179

* cited by examiner

Primary Examiner—Tran Nguyen
(74) Attorney, Agent, or Firm—Sughrue Mion, PLLC

(57) ABSTRACT

A synchronous resolver has: a stator including a plurality of stator poles disposed at regular intervals along the circumferential direction of a ring-shaped stator base portion, the stator poles comprise a plurality of phases; coil bobbins former-wounded stator coils therearound are respectively fitted with and mounted on their associated ones of the stator poles; and, a rotor shiftable in angle with respect to the stator to thereby vary a reluctance component in a gap existing between the stator and the rotor, wherein the coil bobbins are set the positions of the stator coils freely in such a manner that the resolver signals of the respective phases balance well.

11 Claims, 12 Drawing Sheets

ROTOR ROTATION ANGLE (DEGREE)

SYNCHRONOUS RESOLVER, RESOLVER CABLE AND DIRECT DRIVE MOTOR SYSTEM

BACKGROUND OF THE INVENTION

1. Field of the Invention

The present invention relates to an improvement in a direct drive motor system including a synchronous resolver of a variable reluctance type and a cable to connect the resolver and a driver unit.

Hereinafter, in a case of that "synchronous resolver" is called simply "resolver", the "resolver" is used as same meaning as the "synchronous resolver".

In particular, the present invention relates to an improvement in a technique for correcting variations in windings of a synchronous resolver to thereby secure compatibility between products.

In particular, the present invention relates to a wiring structure for a cable for transmitting a resolver signal which is used to detect the rotation angle position of a motor.

2. Description of the Related Art

As a detector for detecting the rotation angle position of a direct drive motor which drives a load directly without using a decelerator, in Japanese Patent No. 3060525, there is disclosed a resolver apparatus which detects a rotation angle position showing the absolute position relationship of a rotor and a stator from a homopolar resolver signal obtained from a homopolar resolver structured such that the fundamental wave components of a reluctance in the airgap between rotor iron core of the homopolar resolver and a stator iron core of the homopolar resolver provides one cycle when the rotor iron core rotates once, and detects a high-resolution rotation angle position from a multipolar resolver signal obtained from a multipolar resolver structured such that the fundamental wave component of the reluctance provides a plurality of cycles when the rotor iron core rotates once, thereby being able to provide a resolver apparatus which can provide a high resolution and can detect the absolute position.

For example, in the case of a resolver having three phases, output signals (see FIG. 19) from the respective phases (A phase, B phase, and C phase) of the resolver can be expressed in the following manner, with the higher-order components thereof neglected (FIG. 20 shows a case of the A phase):

$\phi A = (A_1 + A_2 \sin \theta) \times \sin \omega t$ $\phi B = (B_1 + B_2 \sin (\theta - 2/3\pi)) \times \sin \omega t$ $\phi C = (C_1 + C_2 \sin (\theta - 4/3\pi)) \times \sin \omega t$ where ω expresses an angular velocity corresponding to the frequency f of the exciting signal of the resolver (that is, ω=2 π f).

These signals are converted into two-phase signals using, for example, a phase converter circuit and further they are converted into digital position (angular position) signals using, for example, a known resolver digital converter (RDC). By the way, as the RDC, there can be used a converter having a correction function (for example, a built-in ROM) for correcting higher-order component errors peculiar to the types of resolvers. There can be a drive unit which contains an A/D converter for converting the output signals of the respective phases into digital signals and executing the following processings using software.

As disclosed in JP-B-7-44813, as a detector for detecting the angle position of a servomotor system, there is used a resolver. In the resolver, a rotor iron core shifts in angle with respect to a stator iron core and a reluctance component in a gap existing between the rotor and stator iron cores is thereby caused to vary; that is, using such variation in the reluctance component, the resolver detects the rotation angle position of the servomotor system. On a resolver stator of three phases type, there are wound detect signal lines of A, B and C phases respectively having an electrical angle phase difference of 120°. In case where the windings of the respective phases vary in the winding number, inductance, and resistance values, there is generated an imbalance in the signals of the three phases to cause an error in a true value, thereby degrading the precision of a position detector.

On the other hand, in the conventional resolver apparatus, in a three-phase AC exciting winding is directly wound around a substantially T-shaped magnetic pole projectingly provided on a stator, it is also very difficult to realize a uniform winding state for a large number of magnetic poles, which causes the resolver signals between the respective phases to vary. Since such variations according to individual motors are caused by variations in the sizes of the d.c. components ($A_1$, $B_1$, $C_1$) of the respective phases, the above-mentioned correction by the driver is not able to cope with such variations. Therefore, conventionally, a polyphase signal from a resolver disposed on a direct drive motor having correction data in order to correct above variations is converted to a 2-phase output signal (sin signal, cos signal) by a phase converter circuit disposed in a drive unit; and, after then, there are taken in the correction data for correcting imbalance between the respective phases caused by the variations in the resolver signals, and there is obtained a digital position signal by a resolver digital converter (JP-A-2000-262081).

On the other hand, in a conventional direct drive motor system, a resolver signal cable (a resolver cable) for supplying, an exciting signal to a resolver and, at the same time, for obtaining a resolver signal from the resolver is used to connect together a drive unit and a direct drive motor. In selection of a resolver signal cable used to transmit an analog signal, preferably, there may be selected a resolver signal cable which not only has a thick line diameter but also, in order to restrict electrical interference between signal lines, has a small line electrostatic capacity within the cable.

However, the correction data to be loaded into a drive unit vary according to individual direct drive motors. Accordingly, when the direct drive motor or drive unit is replaced as a simple element due to trouble or for maintenance, since they are not compatible with others, the direct drive motor system comprising the direct drive motor, drive unit and cables (resolver cables, motor cables) for connecting these motor and unit must be replaced as a whole.

As measures to deal with this, in JP-A-2000-262081, there is disclosed a resolver apparatus structured such that a motor main body stores correction data therein and a memory disposed on the driver side is used to read the correction data. In this resolver apparatus, however, the correction data must be added to the motor side in the form of e.g. a ROM and also there is necessary an operation in which the correction data are read by the memory on the driver side.

Also, conventionally, as a resolver cable for transmitting a resolver signal to the drive unit, a required number of resolver signal lines for detection of signals are disposed at arbitrary positions within the cable. However, in case where the position relationship of the respective detect signals within the resolver cables is asymmetric, due to variations in the lengths of the cables, there is caused electrical interference. And, in the case of the resolver cables used in the direct drive motor system, there also arises a problem as to their compatibility.

Therefore, in the case of the conventional resolver signal cable, as shown in FIGS. 16 to 18, the connection thereof is made without taking into account the arrangement between the exciting signal line and the respective phase detect signal lines and the arrangement between the respective phase detect signal lines; and, due to such connection, there is caused an imbalance in the values of the electrostatic capacity between the exciting signal line and the respective phase detect signal lines as well as in the values of the electrostatic capacity between the respective phase detect signal lines. FIG. 16 is a section view of a resolver signal cable of a one-phase excitation three-phase output- type, in which reference character 150 designates a resolver signal cable, 151 an A-phase detect signal line, 152 a B-phase detect signal line, 153 a C-phase detect signal line, and 154 an exciting signal line (a common signal line) which is used to supply an exciting signal from a driver unit to a resolver apparatus. In the resolver signal cable of this type, where the values of the electrostatic capacity between the exciting signal line 154 and the A-phase detect signal line 151, B-phase detect signal line 152, C-phase detect signal line 153 are respectively expressed as $C_A$, $C_B$, $C_C$, there is obtained $C_A = C_C \neq C_B$, namely, there is found an imbalance between them. Further, assuming that the value of the electrostatic capacity between the A-phase detect signal line 151 and B-phase detect signal line 152 is expressed as $C_{AB}$, the value of the electrostatic capacity between the B-phase detect signal line 152 and C-phase detect signal line 153 is expressed as $C_{BC}$, and the value of the electrostatic capacity between the C-phase detect signal line 153 and A-phase detect signal line 151 is expressed as $C_{CA}$, then there is obtained $C_{AB} = C_{BC} \neq C_{CA}$, that is, there is found an imbalance between them. This imbalance, when the length of the cable is changed, has an influence on the respective phase detect signal lines and thus gives rise to an error in the absolute precision of the resolver signal cable.

Now, FIG. 17 is a section view of a resolver signal cable which can provide two kinds of three-phase outputs from one-phase excitation, in which 160 stands for a resolver signal cable, 161–163 respectively designate a first A phase detect signal line, a first B phase detect signal line and a first C phase detect signal line, and 164–166 respectively stand for a second A phase detect signal line, a second B phase signal line and a second C phase detect signal line. 167 stands for an exciting signal line (a common signal line). In the resolver signal cable of this type, where the values of the electrostatic capacity between the exciting signal line 167 and the first A phase, B phase and C phase detect signal lines 161–163 are respectively expressed as $C_{1A}$, $C_{1B}$ and $C_{1C}$, and the values of the electrostatic capacity between the exciting signal line 167 and the second A phase, B phase and C phase detect signal lines 164–166 are respectively expressed as $C_{2A}$, $C_{2B}$ and $C_{2C}$, there are obtained $C_{1A} \neq C_{1B} \neq C_{1C}$ and $C_{2A} \neq C_{2B} \neq C_{2C}$, that is, there is found an imbalance between them. Also, in the case of the respective phase detect signal lines as well, where the values of the electrostatic capacity between the first A and B phases, between the first B and C phases, and the first C and A phases are respectively expressed as $C_{1AB}$, $C_{1BC}$ and $C_{1CA}$, and the values of the electrostatic capacity between the second A and B phases, between the second B and C phases, and the second C and A phases are respectively expressed as $C_{2AB}$, $C_{2BC}$ and $C_{2CA}$, there are obtained $C_{1AB} = C_{1BC} \neq C_{1CA}$ and $C_{2AB} = C_{2BC} \neq C_{2CA}$, that is, there is found an imbalance between them.

Now, FIG. 18 is a section view of another structure of a resolver signal cable which provides two kinds of three-phase outputs for one phase excitation, in which 170 designates a resolver signal cable, 171–173 respectively stand for first A phase, B phase and C phase detect signal lines, and 174–176 respectively represent second A phase, B phase and C phase detect signal lines. 177 stands for an exciting signal line (a common signal line). In the resolver signal cable of this type, where the values of the electrostatic capacity between the exciting signal line 177 and the first A phase, B phase and C phase detect signal lines 171–173 are respectively expressed as $C_{1A}$, $C_{1B}$ and $C_{1C}$, and the values of the electrostatic capacity between the exciting signal line 177 and the second A phase, B phase and C phase detect signal lines 174–176 are respectively expressed as $C_{2A}$, $C_{2B}$ and $C_{2C}$, there are obtained $C_{1A} = C_{1B} = C_{1C}$ and $C_{2A} = C_{2B} = C_{2C}$, that is, it is found that they balance well. However, where the values of the electrostatic capacity between the first A and B phases, between the first B and C phases, and the first C and A phases are respectively expressed as $C_{1AB}$, $C_{1BC}$ and $C_{1CA}$, and the values of the electrostatic capacity between the second A and B phases, between the second B and C phases, and the second C and A phases are respectively expressed as $C_{2AB}$, $C_{2BC}$ and $C_{2CA}$, there are obtained $C_{1AB} = C_{1BC} \neq C_{1CA}$ and $C_{2AB} = C_{2BC} \neq C_{2CA}$, that is, there is found an imbalance between them.

As described above, in case where the values of the electrostatic capacity between the exciting signal line and the respective phase detect signal lines of the resolver signal cable do not balance well, when the length of a cable is changed freely, or when a very long cable is used, there occurs electrical interference between the signal lines due to the imbalance between the values of the electrostatic capacity thereof, which gives rise to errors in the measurement of the resolver. That is, the conventional manner of cable selection, in which a cable is selected simply because it is small in line electrostatic capacity, is not always be able to secure the satisfactory fulfillment of the function of the resolver. Especially, since a signal flowing in a resolver signal cable is a minute analog current, there is influenced by the length of the cable, which is prone to degrade the precision of the resolver.

SUMMARY OF THE INVENTION

In view of the above-mentioned circumstances of the conventional direct drive motor system, it is an object of the invention to provide a compatible direct drive motor system by employing a cable structure which not only can correct coil variations in a resolver disposed in a direct drive motor but also can prevent mutual interference between resolver signals.

In view of the above-mentioned circumstances of the conventional synchronous resolver, it is an object of the invention to provide a synchronous resolver which not only can secure high-level absolute precision but also can realize compatibility between products.

The present invention aims at eliminating the above-mentioned drawbacks found in the conventional resolver cable. Accordingly, it is an object of the invention to provide a resolver cable which can secure a balance not only in the values of the electrostatic capacity between an exciting signal line and the respective phases detect signal lines but also in the values of the electrostatic capacity between the respective phases detect signal lines to thereby be able to enhance the performance of the resolver cable.

In attaining the above object, according to the invention, there is provided a synchronous resolver comprising: a stator including a plurality of stator poles (magnetic poles) disposed at regular intervals along the circumferential direction of a ring-shaped stator base portion, the stator poles comprise a plurality of phases; coil bobbins former-wounded stator coils therearound are respectively fitted with and mounted on their associated ones of the stator poles; and, a rotor shiftable in angle with respect to the stator to thereby vary a reluctance component in a gap existing between the stator and the rotor, wherein the coil bobbins are set the positions of the stator coils freely in such a manner that the resolver signals of the respective phases balance well. Use of this structure not only can secure high-level absolute precision but also can realize compatibility between products.

Preferably, the synchronous resolver as set forth in the above construction, further comprises a collar for preventing the coil bobbin against removal connected to the leading end of the stator pole. And the coil bobbin may include a mounting position loosening preventive mechanism. As the mounting position loosening preventive mechanism, preferably, there may be used, for example, a projection portion which is provided on and projected from the interior of a hollow portion formed in the coil bobbin.

In attaining the above object, according to the invention, there is provided a resolver cable with a multicore structure comprising: one exciting signal lines for supplying an exciting signal to a resolver apparatus; and a plurality of detect signal lines for transmitting one polyphase resolver signal output from the resolver apparatus, wherein the plurality of detect signal lines and the one exciting signal lines are disposed in such a manner that the average values of the electrostatic capacity between the respective ones of the plurality of detect signal lines and the one or more exciting signal lines are substantially equal and the average values of the electrostatic capacity between the mutually adjoining ones of the detect signal lines are substantially equal.

In attaining the above object, according to the invention, there is provided a resolver cable with a multicore structure comprising: at least one exciting signal lines for supplying an exciting signal to a resolver apparatus and a plurality of detect signal lines for transmitting at least two polyphase resolver signals output from the resolver apparatus, wherein the plurality of detect signal lines and the one or more exciting signal lines are disposed in such a manner that the average values of the electrostatic capacity between the respective ones of the plurality of detect signal lines and the one or more exciting signal lines are substantially equal and the average values of the electrostatic capacity between the mutually adjoining ones of the detect signal lines are substantially equal. According to the present structures, there can be provided a resolver cable which can eliminate an imbalance in the values of the electrostatic capacity between the exciting signal line and detect signal lines and an imbalance in the values of the electrostatic capacity between the polyphase detect signal lines and, when the length of the cable is changed freely or when a very long cable is used, is able to secure the proper performance of signals flowing through the cable. Also, since the arrangement of the signal lines within the cable is taken into consideration, it is possible to curb such influences on the signals as much as possible that are caused by variations in the length of a cable or by differences between individual cables.

In attaining the above object, according to the invention, there is provided a direct drive motor system, comparing: a direct drive motor including a homopolar resolver and a multipolar resolver for outputting polyphase resolver signals from the respective resolvers, the homopolar resolver being structured such that, due to rotation of a first rotor, the fundamental wave component of the reluctance in a gap between the first rotor and a first circular-shaped stator provides one cycle, the multipolar resolver being structured such that, due to rotation of a second rotor, the fundamental wave component of the reluctance in a gap between the second rotor and a second circular-shaped stator provides a plurality of cycles; a drive unit, in accordance with the polyphase resolver signals output from the direct drive motor, for outputting an exciting current for driving the direct drive motor; and, a resolver cable for transmitting the polyphase resolver signals output from the direct drive motor to the drive unit, wherein the homopolar resolver and the multipolar resolver of the direct drive motor are constructed by synchronous resolvers as set forth in the above construction.

In addition to this, it is preferable that the direct drive motor system as set forth in the above construction, the resolver cable may comprise at least one exciting signal line for supplying an exciting signal to a resolver apparatus and a plurality of detect signal lines for transmitting a polyphase resolver signal output from the resolver apparatus, and the plurality of detect signal lines and the exciting signal lines may be disposed in such a manner that the average values of the electrostatic capacity between the respective ones of the plurality of detect signal lines, and the exciting signal line may be substantially equal and the average values of the electrostatic capacity between the mutually adjoining ones of the detect signal lines are substantially equal, and wherein the resolver cables may be connected to each of the homopolar resolver and the multipolar resolver.

In addition to this, it is preferable that the resolver cable may be connected to both of the the homopolar resolver and the multipolar resolver.

Use of the present structure can correct variations in the positions of the coils of the resolvers, thereby being able to provide a compatible direct drive motor system. Also, in the case of replacement of the direct drive motor, since the compatibility of the direct drive motor system is secured, the present system is excellent in repair and maintenance.

Also, the resolver cable may be structured such that the distances between the signal lines of the respective phases of the polyphase resolver signals as well as the distances between the respective signal lines and common lines are set substantially uniform. Use of this structure can reduce electrical interference between the signal lines.

DETAILED DESCRIPTION OF THE PREFERRED EMBODIMENTS

Now, description will be given below of an embodiment of a direct drive motor system according to the invention with reference to the accompanying drawings.

Figure 1:
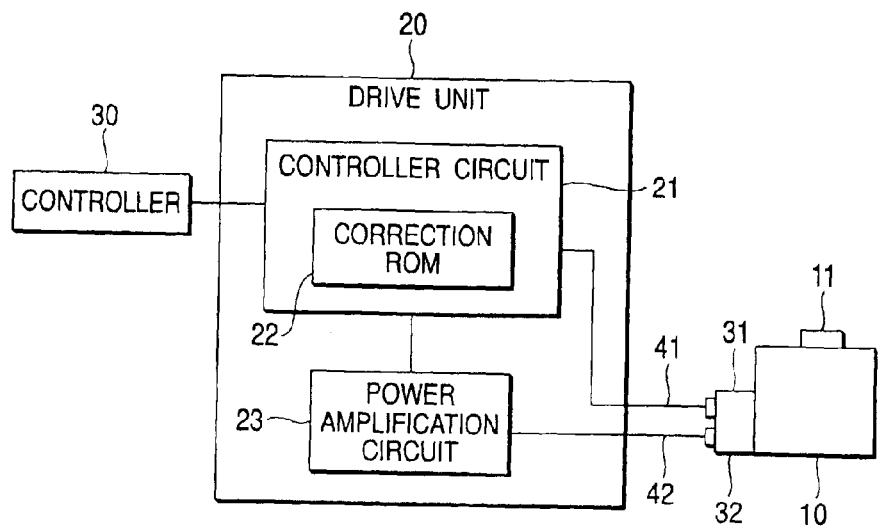
FIG. 1 is a block diagram of the structure of a direct drive motor system.

FIG. 1 is a block diagram of the structure of a direct drive motor system according to the present embodiment. This system comprises a direct drive motor 10 for rotationally driving a rotary shaft 11, a drive unit 20 for driving and controlling the direct drive motor 10, and a resolver cable 41 and a motor cable 42 which are respectively used to connect together the motor 10 and unit 20. The driver unit 20 includes a controller circuit 21 and a power amplification circuit 23. Specifically, the controller circuit 21 not only supplies an exciting signal through the resolver cable 41 and a resolver terminal 31 to an absolute position detecting resolver and a relative position detecting resolver respectively built in the direct drive motor 10, but also takes in polyphase resolver signals output from the respective resolvers to convert them into 2-phase output signals, occurs a synchronous rectification etc. with the use of frequency of excitation signal, takes in correction data stored in a correction ROM 22 to make the corrected signal into an R/D conversion, and outputs the digital position signals to a controller 30. And, the power amplification circuit 23 can be feed-back controlled by the controller 30 to supply an exciting current to a motor terminal 32 through the motor cable 42 so as to control the rotation angle position of the direct drive motor 10 accurately. By the way, the correction ROM does not aim at correcting errors caused by the difference of balance between the respective phases according to the individual motors but aims at correcting the errors that can be determined according to the specifications of resolvers.

Figure 2:
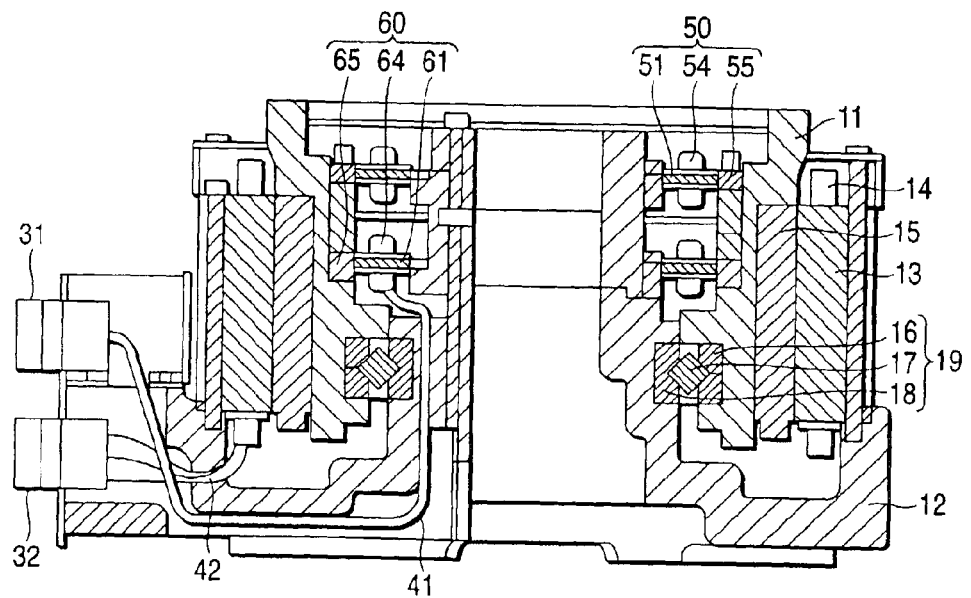
FIG. 2 is a section view of the structure of a direct drive motor system.

FIG. 2 is a section view of the direct drive motor 10. As shown in FIG. 2, the rotary shaft 11, which is stored within a hollow cylindrical housing 12, is rotatably supported on the direct drive motor 10 through a cross roller bearing 19. The cross roller bearing 19 is composed of an inner ring 18 situated in the housing 12, an outer ring 16 situated in the inner peripheral surface of the lower end portion of the rotary shaft 11, and a rolling body 17 interposed between the inner and outer rings. In the outer peripheral surface of the inner ring 18, there is formed an outer raceway recessed groove which is composed of mutually perpendicular first and second inclined raceway surfaces and the section of which is a rectangular equilateral triangle; and, in the inner peripheral surface of the outer ring 16, there is formed an inner raceway recessed groove which is composed of mutually perpendicular third and fourth inclined raceway surfaces and the section of which is a rectangular equilateral triangle. The rolling body 17 includes a plurality of first rolling bodies 17 which are allowed to roll on the first and fourth inclined raceway surfaces, and second rolling bodies 17 which are respectively interposed between the mutually adjoining ones of the first rolling bodies and are allowed to roll on the second and third inclined raceway surfaces.

A plurality of silicon-steel plates are placed on the outer peripheral surface of the lower end portion of the rotary shaft 11 and, fitted and fixed to comprise a circular-shaped motor rotor 15 including a plurality of pole teeth which respectively project outwardly in the radial direction of the motor rotor 15; and, a plurality of silicon-steel plates are placed on the inner peripheral surface of the housing 12 that is disposed opposed to the outer peripheral surface of the lower end portion of the rotary shaft 11 and, fitted and fixed to comprise a motor stator 13 including a plurality of magnetic poles respectively projecting inwardly in the radial direction of the motor stator 13. Said magnetic poles each has a substantially T-like shape; and, around the magnetic poles, there is wound a stator coil 14 which is used to generate a rotation magnetic field due to an exciting current supplied through the motor cable 42 from the power amplification circuit 23 and, at the positions of the magnetic poles that are opposed to the pole teeth of the motor rotor 15 with a given clearance between them, there are formed a large number of magnetic pole teeth.

On the rotary shaft 11, there are disposed a resolver 50 which is used to detect the absolute angle position of the rotary shaft 11, and a resolver 60 for detecting the relative angle position thereof. The resolver 50 is a homopolar resolver which comprises a resolver rotor 55 composed of a circular-shaped laminated core fixedly contacted to the inner peripheral surface of the rotary shaft 11, a resolver stator 51 composed of a circular-shaped laminated core which is fixedly contacted to the housing 12 and is disposed opposed to the resolver rotor 55, and a stator coil 54 wound around the magnetic poles of the resolver stator 51. On the other hand, the resolver 60 is a multipolar resolver which comprises a resolver rotor 65 composed of a circular-shaped laminated core fixedly contacted to the inner peripheral surface of the rotary shaft 11, a resolver stator 61 composed of a circular-shaped laminated core which is fixedly contacted to the housing 12 and is disposed opposed to the resolver rotor 65, and a stator coil 64 wound around the magnetic poles of the resolver stator 61.

Figure 3:
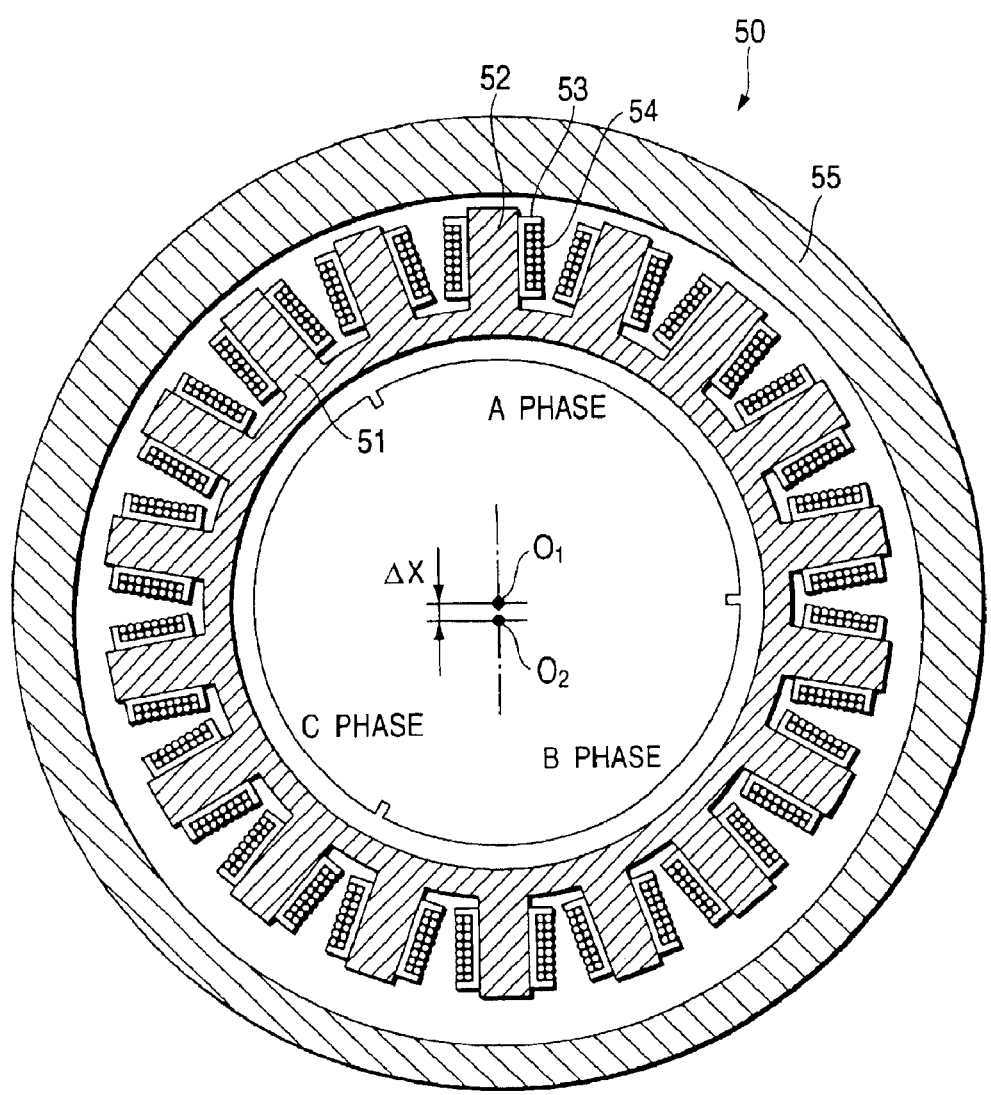
FIG. 3 is a section view of the structure of an absolute position detecting resolver.

Now, FIG. 3 is a section view of the resolver 50 for detecting the absolute position. As shown in FIG. 3, the resolver 50 is a resolver of a 3-phase variable reluctance type and includes a structure in which the reluctance of a gap between the resolver stator 51 and resolver rotor 55 varies according to the rotation angle positions of the resolver rotor 55 and, in case where the resolver rotor 55 rotates once, the fundamental wave component of the reluctance variation provides one cycle. That is, the thickness of the resolver rotor 55 is varied continuously so that the outside diameter center and inside diameter center of the resolver stator 51 as well as the outside diameter center of the resolver rotor 55 are coincident with the rotation center $O^1$ of the direct drive motor, whereas the inside diameter center $O^2$ of the resolver rotor 55 is shifted by δ x with respect to the rotation center $O^1$. In addition to this, the resolver rotor 55 is composed by a laminating of silicon steel plates made along a way described in JP-A-2000-116094, in order to reduce a influence of high frequency element.

On the resolver stator 51, there are disposed three groups of magnetic poles 52 which respectively constitute A, B and C phases at the intervals of 120°, each group including six magnetic poles 52; that is, a total of eighteen magnetic poses are disposed on the resolver stator 51. To each of the magnetic poles 52, there is fixed a stator coil 54 which is wound around a coil bobbin 53 obtained by molding resin. Thanks to this structure, in case where an exciting signal is applied to the common terminal of the stator coil 54, while the resolver rotor 55 rotates once, the stator coils 54 in the A, B and C phases respectively output single pole resolver signals of one cycle which are out of phase by an angle of 120°.

Figure 5:
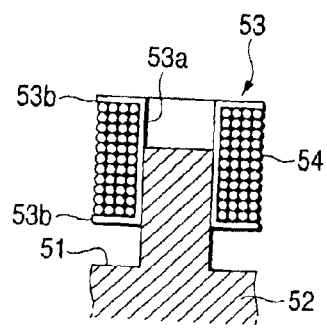
FIG. 5 is a section view of a coil bobbin, showing how to position a stator coil.

As shown in FIG. 5, the coil bobbin 53 comprises a winding frame portion 53a for winding the stator coil 54 therearound, and two collar portions 53b respectively formed on the upper and lower peripheries of the winding frame portion 53a so as to extend outwardly from the upper and lower peripheries; and, the stator coil 54 is wound uniformly around the winding frame portion 53a. Each of the magnetic poles 52 is formed in a prism-shaped member which is provided on and projected vertically from the outer peripheral surface of the resolver stator 51; and, the magnetic pole 52 stands erect in the longitudinal direction thereof and has a straight shape with no narrow part included therein. The bobbin coil 53, on which the stator coil 54 has been previously former-wound, is fitted with and mounted on the magnetic poles 52, the above-mentioned two-phase signal (a cos signal and a sin signal) that has been converted from the resolver signal, or, a signal which, after the cycle thereof is rectified, is not yet converted to a digital signal (it may be a signal which has been converted into a speed signal) are observed on oscilloscope with a given AC signal applied to the stator coil 54, and the mounting position of the bobbin coil 53 is adjusted in such a manner that the resolver signals in the respective phases balance well, thereby being able to eliminate the imbalance that could be caused due to the mounting error of the stator coil 54.

In order to obtain a more accurate balance, there is an another method in which a rotary encoder serving as an angular position reference is connected to a motor after it is assembled, the output signal (the angular position) of the rotary encoder is compared with a digital position signal to be obtained from the resolver, and the coil bobbin position is adjusted so that these two signals can coincide with each other.

Figure 21:
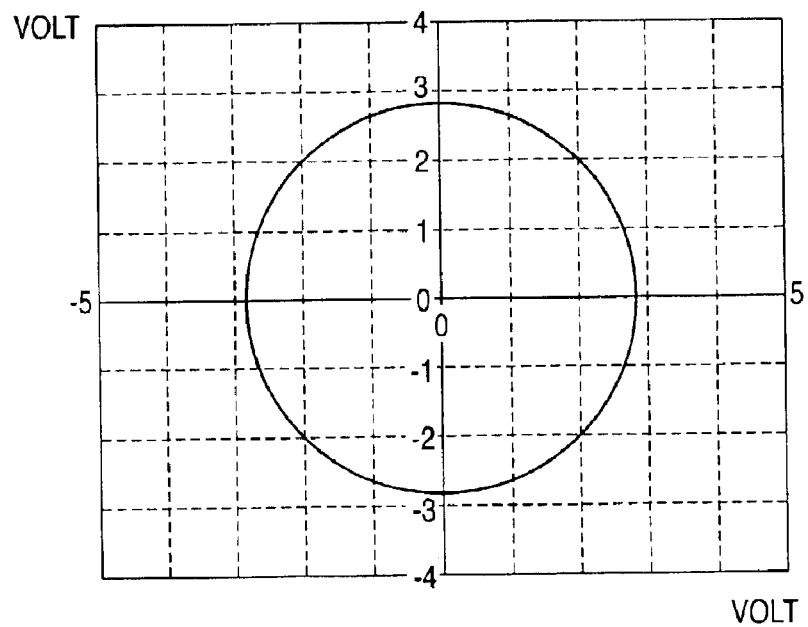
FIGS. 21 and 22 are a Lissajou's figure (waveform) and velocity waveforms in a in a well-balanced state.
Figure 23:
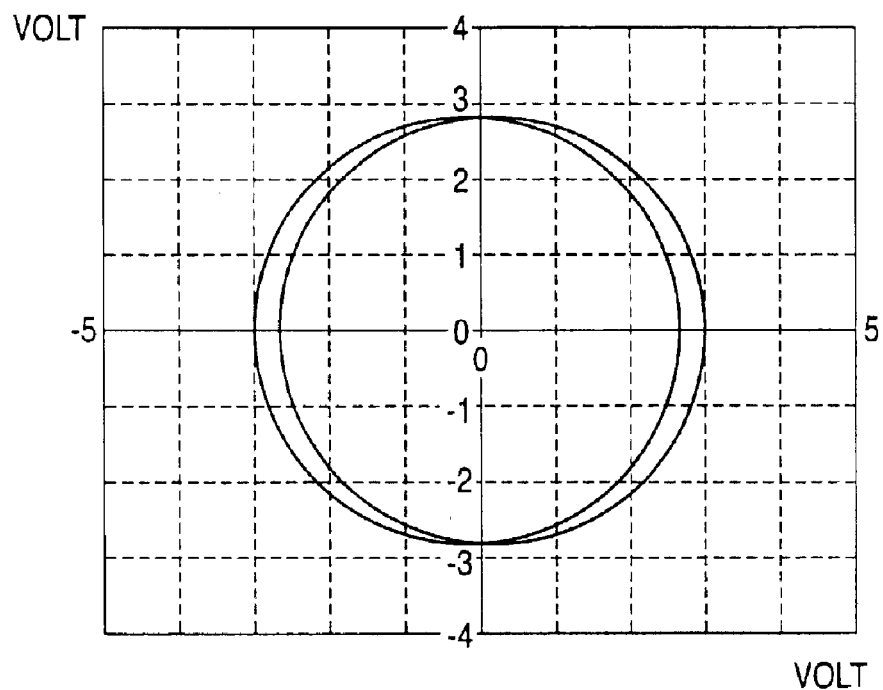
FIGS. 23 and 24 are a Lissajou's figure (waveform) and velocity waveforms in case where only the A phase is larger only 1% in the DC component thereof.

The above mentioned first method is a method for adjusting the coil bobbin position relatively roughly while observing a Lissajou's figure (waveform) obtained by inputting a cos signal and a sin signal which have been converted to two-phase signals when the resolver rotor rotates once around the resolver stator. In this method, in a well-balanced state, two substantially circular envelopes (due to existence of higher-order components, they are unable to provide perfectly circular envelopes) are displayed so as to be substantially concentric with each other (FIG. 21). On the other hand, for example, in case where only the A phase is larger only 1% in the DC component thereof, as shown in FIG. 23, the difference between the two envelopes increases in the direction of 0°. In case where the B phase is 1% larger in the DC component thereof, the difference increases in the direction of 120°; and, in case where the C phase is 1% larger in the DC component thereof, the difference increases in the direction of 240°. That is, the phase to be adjusted can be decided in accordance with the sizes and directions of the difference between the two envelopes. While observing the envelopes on an oscilloscope, the bobbin position is adjusted so as to be able to eliminate such difference.

Figure 22:
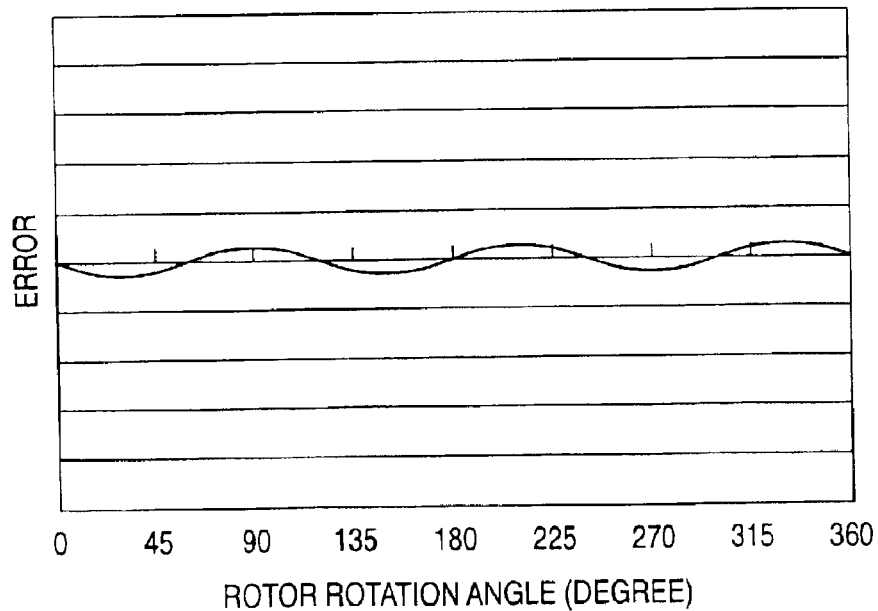
Figure 24:
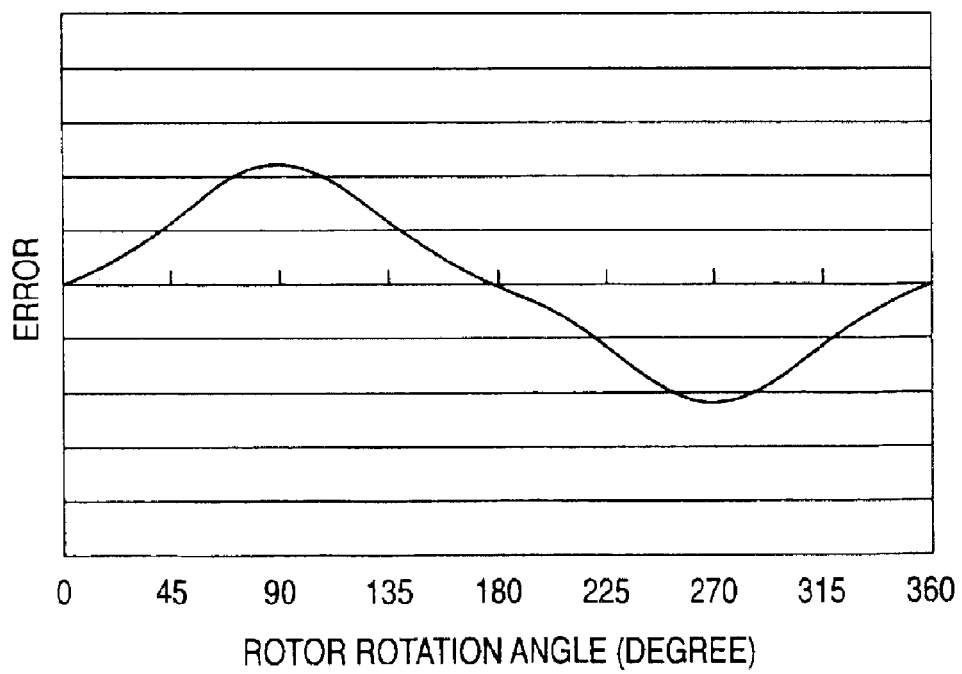

In the above mentioned second method (a method for adjusting the coil bobbin position while observing velocity waveforms when the resolver rotor rotates once around the resolver stator), in a well-balanced state, as shown in FIG. 22, there is obtained a substantially straight line (strictly speaking, due to existence of higher-order components, in the case of three phases, there is obtained a substantially sine-wave-shaped waveform having three cycles for one rotation of a rotor). On the other hand, in case where the A phase is 1% larger in the DC component thereof, as shown in FIG. 24, the waveform varies characteristically and there are produced portions which are greatly shifted from the original point, thereby being unable to provide three cycles. From the angular positions (in this example, 90° and 270° positions) that are greatly shifted, it is possible to judge which phase is shifted; and, from the shifting directions (in this example, positive direction at 90° and negative direction at 270°) and the shifting dimension, the shifting size of the phase can be judged. Therefore, the bobbin position can be adjusted in accordance with such judgement.

In the above mentioned third method (a method for adjusting the bobbin position by comparing the output signal of the encoder serving as a reference with the digital position signal of the resolver), there can be obtained results which are substantially similar to the second method. However, since the third method is enforced after the higher-order components are corrected by a correction ROM 22, in normal cases, there is obtained a waveform which is nearer to a straight line than the sine wave waveform as in FIG. 22. This method may be used, for example, in a check step.

According to an experiment conducted by the inventors, it has been confirmed that, in case where the position adjustment can be occurred in any one of six magnetic poles 52 composing each phases of the A, B and C phases, the balance adjustment can be secured and the balance of the whole resolver stator 51 can also be secured.

Since the magnetic pole 52 has a shape in which the width thereof is uniform along the height direction thereof, even after the coil bobbin 53 is mounted thereon, it can be fine adjusted in the vertical direction. In case where the coil bobbin 53 is fixedly secured to the magnetic pole 52 using an adhesive in a state where the balance of the respective phases is secured, there can be obtained an absolute position detecting resolver which is free from variations between products, that is, a compatible absolute position detecting resolver. As in the conventional coil bobbin, in case where a former-wound coreless coil is directly mounted on and fixed to the magnetic pole 52, there is generated a minute gap between the coil and magnetic pole 52, which makes it difficult to enhance the mounting precision of the coil. On the other hand, in case where the resin-molded coil bobbin 53 is used, since the coil is wound around the magnetic pole 52 through the elastic resin, the proper pressing force can prevent generation of such gap, which makes it possible to position the coil with high precision.

Figure 4:
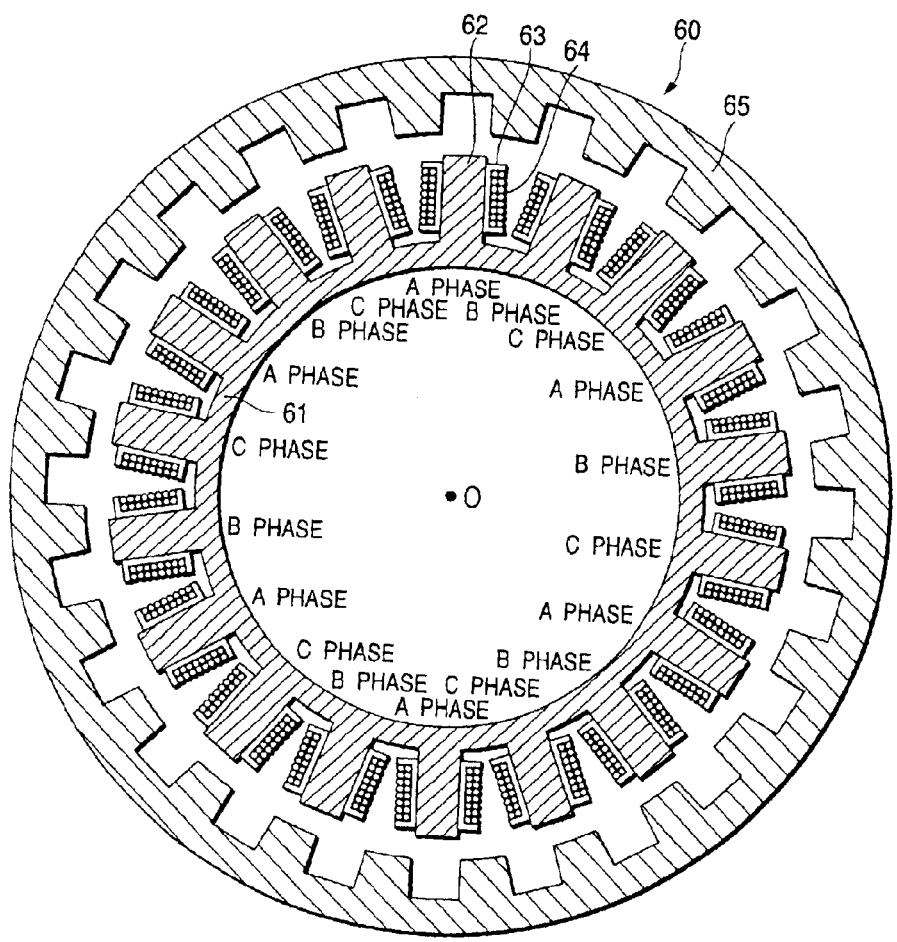
FIG. 4 is a section view of the structure of a relative position detecting resolver.

Now, FIG. 4 is a section view of the relative position detecting resolver 60. As shown in FIG. 4, the resolver 60 has a structure that the inside diameter center O of the resolver stator 61 is coincident with the inside diameter center O of the resolver rotor 65, the reluctance of a gap between the resolver stator 61 and resolver rotor 65 varies according to the rotation angle positions of the resolver rotor 65, and, when the resolver rotor 65 rotates once, the fundamental wave component of the variations in the reluctance provides a plurality of cycles. On the outer peripheral surface of the resolver stator 61, there are disposed magnetic poles 62 alternately at regular intervals, in the present embodiment, a total of eighteen magnetic poles 62, in such a manner that the A, B and C phases are shifted at an electrical angle of 120° from one another; and, around the respective magnetic poles 62, there are wound stator coils 64 through their respective coil bobbins 63. In addition to this, the resolver rotor 65 is composed by a laminating of silicon steel plates made along a way described in JP-A-2000-116094, in order to reduce a influence of high frequency element.

By the way, the number of the magnetic poles 62 may be the multiples of the number of phases (in the present embodiment, 3) and is not limited to eighteen. Also, in the present embodiment, on the inner peripheral surface of the resolver rotor 65, there are formed salient-pole-shaped twenty-four pole teeth which are formed at a given pitch. However, the number of the pole teeth may be set for the integer reciprocals of the number of teeth of the motor rotor 15 and thus it is not limited to twenty-four. Further, in case where the above pole teeth are further fine divided electrically, the resolving power of the relative position detecting resolver 60 can be enhanced further. In case where an exciting signal is supplied to the common terminal of the stator coil 64, while the resolver rotor 65 rotates once, AC signals of 24 cycles are output in every phase as multiple pole resolver signals.

Here, the magnetic pole 62 is a prism-shaped member which is provided on and projected vertically from the outer peripheral surface of the resolver stator 61 and, similarly to the above-mentioned magnetic pole 52, the magnetic pole 62 has a straight shape with no narrow part included therein. Therefore, since the stator coil 64, similarly to the case explained with reference to FIG. 5, is wound around the magnetic pole 62 through the resin-molded coil bobbin 63 is used, the stator coil 64 can be positioned with high precision, thereby being able to provide a relative position detecting resolver which is free from variations between products, that is, a compatible relative position detecting resolver 60.

A method for adjusting a position of the coil bobbin 63 can be carried out as same as a method of the absolute position detecting resolver 50. However, in a case of that, for example, the above second or third method is carried out, in the case of the absolute positin detecting resolver 50, the pattern shown in FIG. 22 or FIG. 24 is obtained while one revolution of the resolver rotor. On the other hand, in the case of the relative position detecting resolver 60, the pattern shown in FIG. 22 or FIG. 24 is obtained while a revolution by one pitch of the rotor teeth (in this case, 1/24 revorution= 15°).

Figure 6:
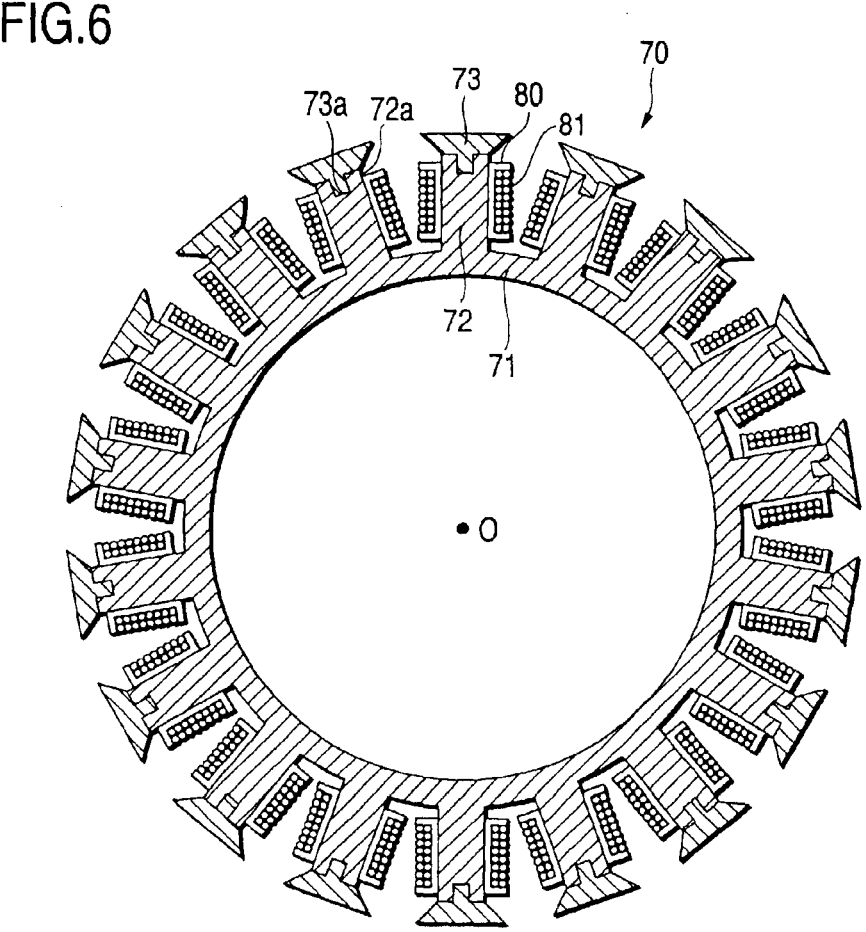
FIG. 6 is a section view of a resolver stator.

FIG. 6 is a section view of a resolver stator of an another embodiment. In the resolver stator 70, there are disposed six stator poles 72 constituting each of A, B and C phases, a total of eighteen stator poles 72, at the intervals of 20° in the circumferential direction of a stator base portion 71 which is made of a ring-shaped laminated iron core. Each stator pole 72 has a prism-like shape and stands erect with respect to the stator base portion 71. Also, the section shape of the stator pole 72 is uniform along the longitudinal direction thereof; and, the stator pole 72 is structured such that a coil bobbin 80, on which a winding (a stator coil) 81 is former-wound, can be mounted onto the stator pole 72. A collar 73 for preventing the coil bobbin 80 against removal is connected by welding to the leading end of the stator pole 72, while a projecting portion 73a provided on and projected from the lower end portion of the collar 73 is fitted into a recessed portion 72a recessed formed in the leading end portion of the stator pole 72. In the above structure, in case where an exciting signal is applied to the common terminal of the winding 81, a resolver rotor is rotated once, so that, from the respective A phase, B phase and C phase windings, in every cycle, there are output signals which are out of phase by 120° from one another. By the way, as the method for connecting the collar 73 to the stator pole, the welding method is not limitative but, for example, a caulking method can be employed and also a bonding method using an adhesive can also be used, provided it does not ruin electric conductivity.

Figure 7:
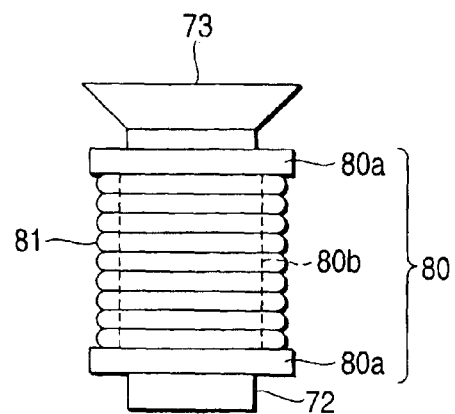
FIG. 7 is an explanatory view of a coil bobbin.

As shown in FIG. 7, the coil bobbin 80 comprises a winding frame portion 80b for winding the winding 81 thereon and two collar portions 80a respectively formed so as to extend outwardly from the upper and lower outer peripheral portions of the winding frame portion 80b, while the winding 81 is uniformly wound on the winding frame portion 80b. As the material of the coil bobbin 80, there can be used any non-magnetic material, provided it is has a proper degree of elasticity. For example, in the case of thermoplastic resin such as styrene-system resin, polycarbonate-system resin, polyphenylene ether-system resin, nylon, and polybutylene terephtalate-system resin, injection molding is easy. The stator pole 72 is a prism-shaped member which is provided on the outer peripheral surface of the stator base portion 71 so as to project perpendicularly from the present outer peripheral surface; and, the stator pole 72 has an erect shape with no curved portion therein. The bobbin 80 with the winding 81 previously former-wound thereon is fitted with the stator pole 72, the above-mentioned two-phase signal (a cos signal and a sin signal) that has been converted from the resolver signal, or, a signal which, after the cycle thereof is rectified, is not yet converted to a digital signal (it may be a signal which has been converted into a speed signal) are observed on an oscilloscope while a given AC signal is being applied to the winding 81, and the mounting position of the coil bobbin 80 is adjusted in such a manner that the resolver signals of the respective phases can balance well, thereby being able to eliminate an imbalance caused by the mounting error of the winding 81. According to an experiment made by the inventors, it has been confirmed that, in case where the position of the coil bobbin 80 is adjusted at least at one position for each of the phases, the coil bobbin 80 can be made to balance well as a whole.

Since the stator pole 72 is structured such that the section shape thereof is substantially uniform along the longitudinal direction (the height direction) thereof, even after the coil bobbin 80 is fitted with the stator pole 72, the stator pole 72 can be fine adjusted in the vertical direction thereof. In a state where the respective phases balance well, in case where the coil bobbin 80 is fixed to the stator pole 72 using an adhesive, there can be obtained a synchronous resolver which is free from variations between products, that is, which is compatible. As in the conventional synchronous resolver, in case where a coil is directly wound on the stator pole 72, there is generated a minute gap between the winding and stator pole 72, which makes it difficult to enhance the mounting precision of the winding. On the other hand, in case where there is used the resin-molded coil bobbin 80, since the winding 81 is wound on the stator pole 72 through the elastic resin of the coil bobbin 80, there can be obtained a proper degree of pressure contact force, which can curb the generation of such minute gap and thus can attain the high-precision positioning of the winding 81.

Figure 8:
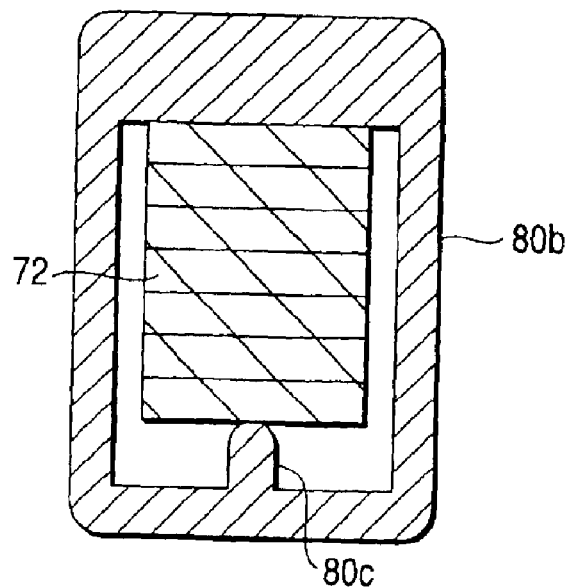
FIG. 8 is a section view of a coil bobbin.
Figure 9:
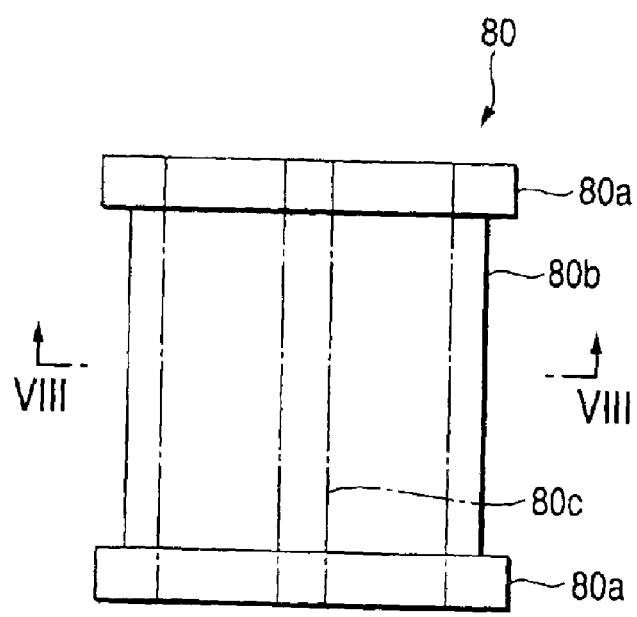
FIG. 9 is an explanatory view of a coil bobbin.

Now, FIG. 8 is a section view of the coil bobbin 80. In the coil bobbin 80, there is formed a hollow portion which extends along the longitudinal direction of the coil bobbin 80 and also into which the stator pole 72 can be fitted; and, a loosening preventive projection portion 80c is provided on the coil bobbin 80 so as to project toward the interior of the hollow portion. The leading end of the projection portion 80c has a semicircular-shaped section, whereby the projection portion 80c can be contacted with the stator pole 72 with a proper pressure contacting force to thereby prevent the coil bobbin 80 from shifting in position in the vertical direction thereof. FIG. 9 is a perspective view of the coil bobbin 80, showing a state thereof in which the projection portion 80c is provided on and projected from an inner cylinder along the longitudinal direction of the coil bobbin 80. However, the shape of the projection portion 80c is not limited to the shape shown in FIG. 9 but, for example, it may also be composed of a projecting portion or a recessed portion having a V-shaped or U-shaped section.

Figure 19:
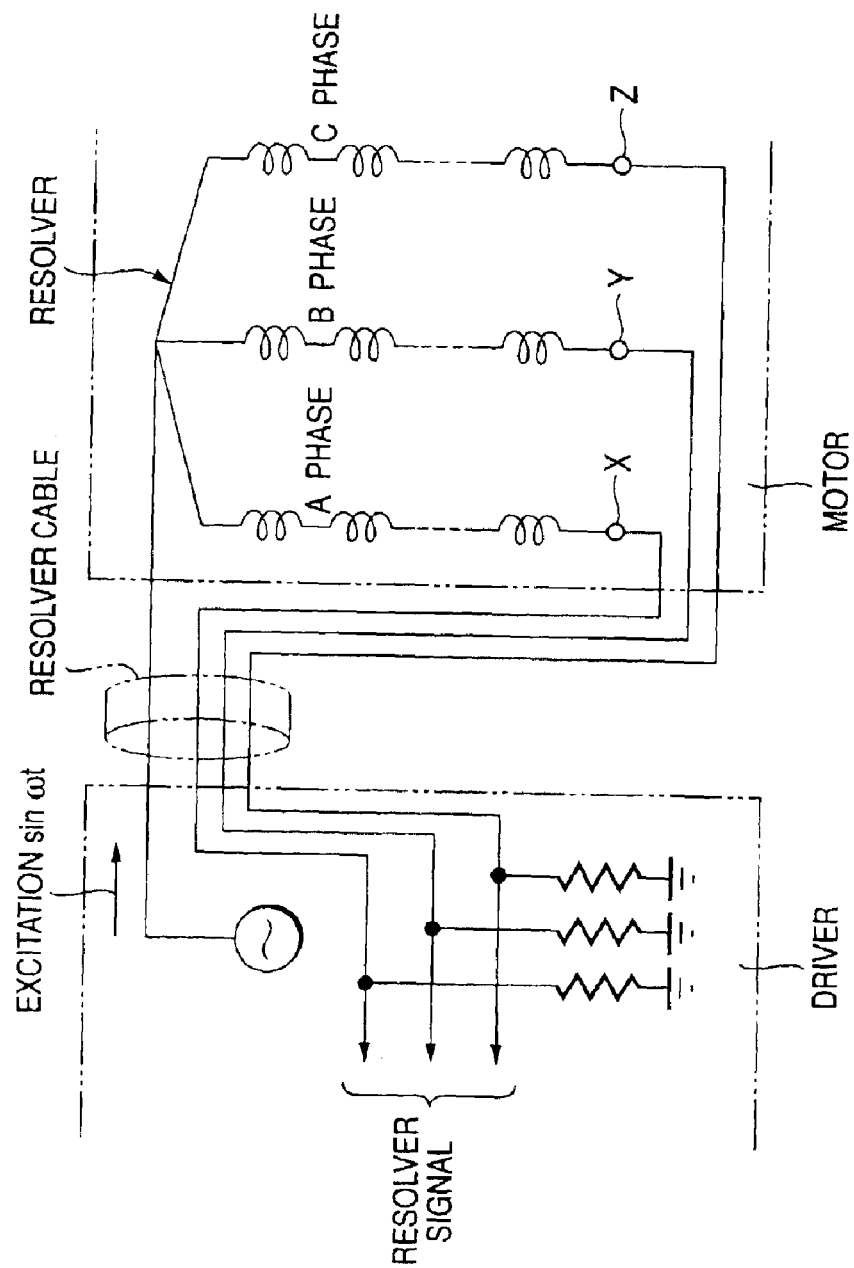
FIG. 19 is a part of a pattern diagram of a detector for detecting the angle position of a servomotor system.
Figure 20:
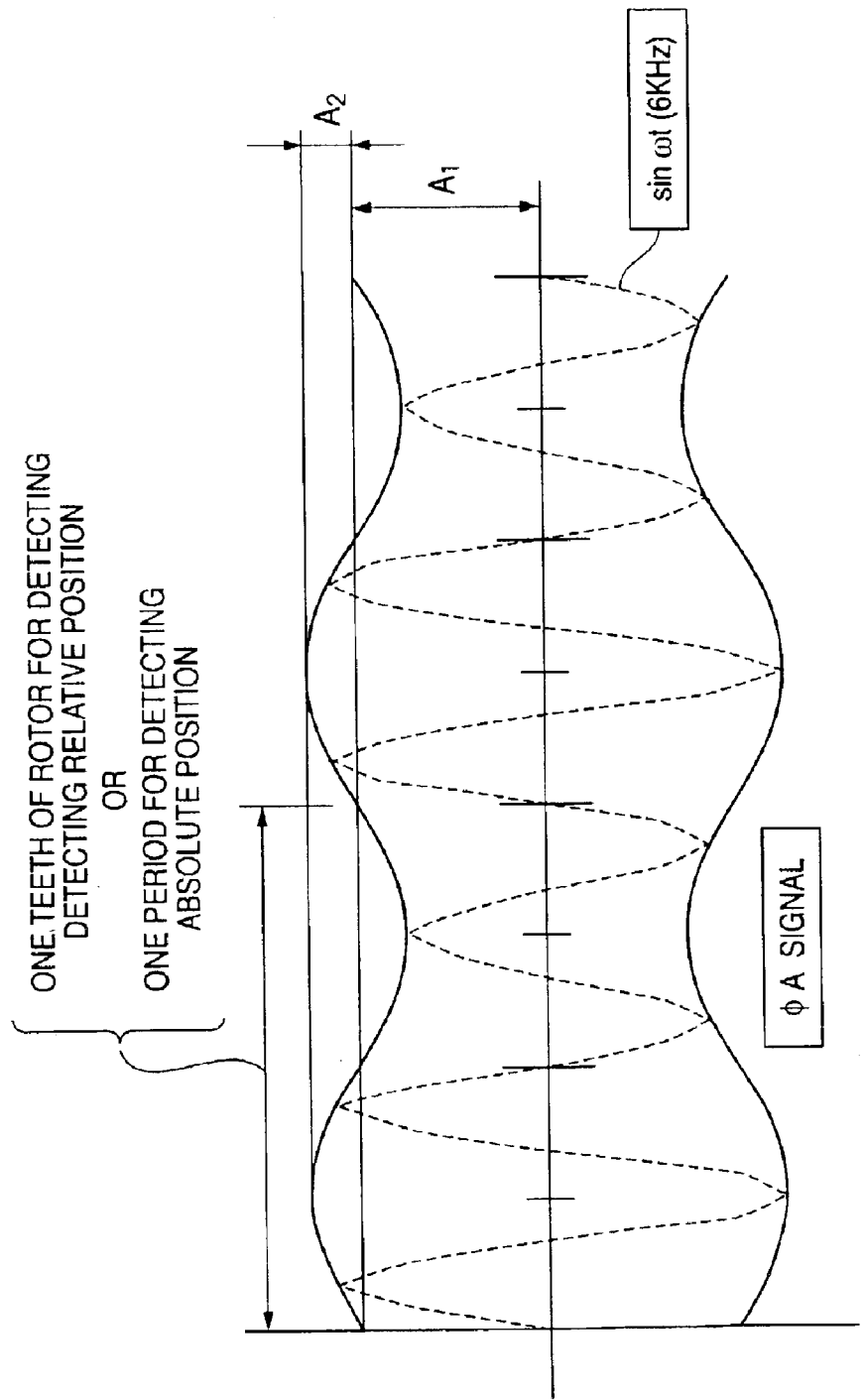
FIG. 20 is a diagram of an output signal from the A phase of the resolver with the higher-order components thereof.

By the way, in addition to the adjustment of the mounting position of the coil bobbin 80, or instead of this, for example, variable resistances may also be respectively connected to their associated windings (for, example at the positions of X, Y, Z as shown in FIG. 19); that is, in this case, variations in the respective phases can be fine adjusted. Also, the material of the coil bobbin is not limited to resin but there can also be used other material such as plastic, provided that it is non-magnetic and highly elastic as well as can provide a proper pressure contacting force. Further, provision of the collar 73 is not always essential but, in a case where the coil bobbin 80 can be positively fixed to the stator pole 72, the collar 73 is not necessary. Still further, in a case where the collar 73 is mounted on the stator pole 72, as described above, the stator pole 72 and collar 73 may be structured as separate parts, or, for example, a recessed portion (or a projecting portion) may be formed in the lower end portion of a stator pole with a collar, in the stator base portion 71, there may be formed a projecting portion (or a recessed portion) which can be fitted with the recessed portion (or the projecting portion) of the stator, and, in a state where they are fitted with each other, they may be fixedly connected together according to a proper method using an adhesive. Also, the coil bobbin 80 may be previously divided in the vertical direction into two sections; in a state where the stator pole 72 is inserted into between the two sections, the stator 72 and coil bobbin 80 may be connected together; and, the winding 81 may be then wound directly on the thus-connected stator and coil bobbin.

The above constructions as shown in FIGS. 6 to 9 are employed in either a resorver for detecting absolute position or a resorver for detecting relative position.

Also, in the above description, there is shown a structure in which the projection portion 80c is provided on the coil bobbin 80. However, in case where the loosening of the coil bobbin 80 can be prevented by the elasticity of the resin of the coil bobbin 80, the projection portion 80c can be omitted. And, use of the coil bobbin 80 is preferred in order to facilitate the position adjustment, to enhance the mounting precision and to prevent the windings against damage. However, the invention can also apply to a case where the winding is directly wound on the stator pole 72 using an insulator, or to a case where a former-wound coil is inserted through an insulator.

According to the present embodiment, not only higher-level absolute precision can be secured but also the compatibility of the products can be secured. Also, since a synchronous resolver, which is a mechanical part, and an operation circuit part, which is an electrical circuit control part, can be manufactured and managed separately, in their respective manufacturing processes, there can be eliminated the step of correcting variations in the synchronous resolver, and they can be manufactured independently up to the step of manufacturing a final product. Further, since a synchronous resolver according to the present embodiment is compatible, it is advantageous in maintenance and repair.

By the way, in addition to the position adjustment of the coil bobbin, for example, variable resistances may also be connected to the respective coils and thus the coils can be fine adjusted using the variable resistances. Also, the material of the coil bobbin is not limited to resin but there can also be used any other kind of blank material, provided that it is non-magnetic, highly elastic and can provide a proper pressing force. In the above embodiment, description has been given of a case using a resolver having three phases. However, this is not limitative but the invention can also be applied to a resolver having two phases or a resolver having four or more phases. Also, in the above embodiment, it is described that the stator is disposed so as to be opposed to the inside of the rotor. However, the present invention may employ a construction that the stator is disposed so as to be opposite to the outside of the rotor. Namely, the resolver rotor may be a construction having rotor tooth on the outer peripheral surface thereof (for detecting the relative position) or a construction having an eccentric outer peripheral surface thereof (for detecting the absolute position), and the resolver rotor may be a construction having magnetic poles protruded inwardly in a radial direction thereof. With use of the above constructions, the method for adjusting a position of the coil bobbin of the present invention is carried out.

Figure 10:
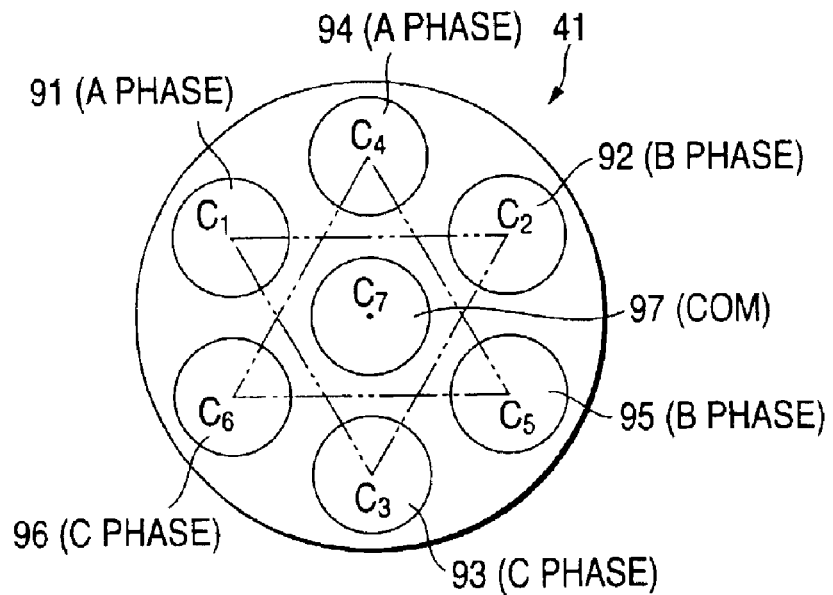
FIG. 10 is a section view of the structure of a resolver cable.

Now, FIG. 10 is a section structure view of the resolver cable 41. In FIG. 10, reference characters 91, 92, 93 respectively designate the signal lines of the relative position detecting resolver 60; and, specifically, 91 designates the signal line for the A phase, 92 the signal line for the B phase, and 93 the signal line for the C phase, respectively. Also, 94, 95 and 96 respectively stand for the signal lines of the absolute position detecting resolver 50; and, specifically, 94 designates the signal line for the A phase, 95 the signal line for the B phase, and 96 the signal line for the C phase, respectively. In this manner, since the signal lines of the relative position detecting resolver 60 and absolute position detecting resolver 50 are disposed alternately, the centers $C_1$, $C_2$, $C_3$ of the signal lines 91, 92, 93 and the centers $C_4$, $C_5$, $C_6$ of the signal lines 94, 95, 96 are respectively adjusted at almost regular intervals. That is, a triangle connecting together $C_1$–$C_2$–$C_3$ has a shape which is near to an equilateral triangle. Similarly, a triangle connecting together $C_4$–$C_5$–$C_6$ has a shape which is near to an equilateral triangle. Also, since a common line 99 is disposed in the center of the resolver cable 41, the distances between $C_1$–$C_6$ and the center point $C_9$ of the common line 99 are all adjusted so as to be almost equal. Use of this structure can reduce the electrical interference of the resolver signals of the respective phases.

Figure 11:
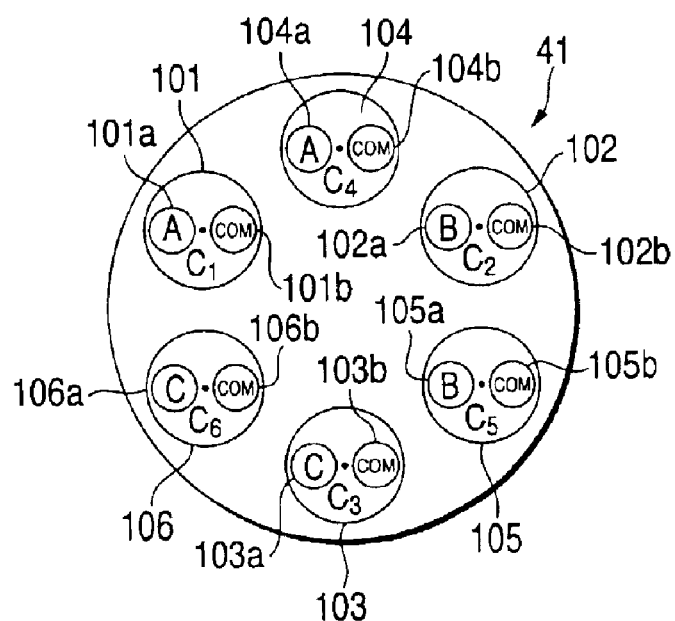
FIG. 11 is a section view of the structure of a resolver cable.

Now, FIG. 11 is a section structure view of another embodiment of the resolver cable 41. In FIG. 11, reference numerals 101, 102, 103 respectively designate twisted pair cables each composed of a signal line of a relative position detecting resolver 60 and a common line; and, 101a designates a signal line of the A phase, 102a a signal line of the B phase, 103a a signal line of the C phase, and 101b–103b common lines, respectively. Also, 104, 105, 106 respectively stand for twisted pair cables each composed of a signal line of an absolute position detecting resolver 50 and a common line; and, 104a stands for a signal line of the A phase, 105a a signal line of the B phase, 106a a signal line of the C phase, and 104b–106b common lines, respectively. In this manner, since the signal lines of the relative position detecting resolver 60 and absolute position detecting resolver 50 are disposed alternately, the centers $C_1$, $C_2$, $C_3$ of the signal lines 101, 102, 103 and the centers $C_4$, $C_5$, $C_6$ of the signal lines 104, 105, 106 are respectively adjusted at almost regular intervals. That is, a triangle connecting together $C_1$–$C_2$–$C_3$ has a shape which is near to an equilateral triangle. Similarly, a triangle connecting together $C_4$–$C_5$–$C_6$ has a shape which is near to an equilateral triangle. Also, since the cables are respectively twisted pair cables, the distances between the respective signal lines and common lines can be set equal. Use of this structure can reduce the electrical interference of the resolver signals of the respective phases.

Figure 12:
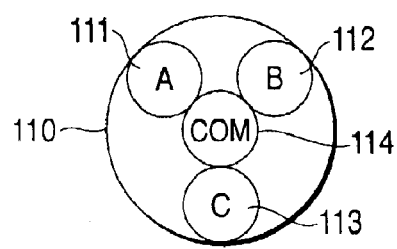
FIG. 12 is a section structure view of a resolver signal cable of a one-phase excitation three-phase output type.

Now, FIG. 12 is a section structure view of a resolver signal cable of a one-phase excitation three-phase output type. In FIG. 12, reference character 110 designates a resolver signal cable, 112 and 113 respectively stand for A phase, B phase and C phase detect signal lines, and 114 expresses an exciting signal line (a common signal line), which forms a four-core structure. The respective signal lines are twisted in the axial direction and, although a section structure shown in FIG. 12 does not exist exactly in every section thereof, on the average, the arrangements of the respective signal lines keep such position relationship as shown in FIG. 12. The signal lines 112 and 113 of the respective phases are respectively situated at the vertices of an equilateral triangle, while the exciting signal line 114 is situated at the barycenter of the present equilateral triangle. Therefore, the distance between the signal lines 111 and 112, the distance between the signal lines 112 and 113, and the distance between the signal lines 113 and 111 are all equal; and further, the distances between the exciting signal line 114 and the respective signal lines 111, 112 and 113 are also equal. Accordingly, where the value of the electrostatic capacity between the signal line 111 and exciting signal line 114, the value of the electrostatic capacity between the signal line 112 and exciting signal line 114, and the value of the electrostatic capacity between the signal line 113 and exciting signal line 114 are respectively expressed as $C_A$, $C_B$ and $C_C$, the value of the electrostatic capacity between the signal lines 111 and 112 is expressed as $C_{AB}$, the value of the electrostatic capacity between the signal lines 112 and 113 is expressed as $C_{BC}$, and the value of the electrostatic capacity between the signal lines 113 and 111 is expressed as $C_{CA}$, there are obtained $C_A=C_B=C_C$ and $C_{AB}=C_{BC}=C_{CA}$, thereby being able to secure a balance in the values of the electrostatic capacity between the detect signal lines of the respective phases and exciting signal line as well as in the values of the electrostatic capacity between the detect signal lines of the respective phases.

According to the present embodiment, there can be obtained the following advantages: that is, (1) the cable length can be selected freely and the guarantee range of a signal used can be widened; (2) a very long cable length can be selected; (3), in an actual production site, in checking a signal line, there is eliminated the need to use a cable equivalent in quality to a product; (4) there is eliminated the need to select a cable which is smaller in line electrostatic capacity; and, (5) it is not necessary to manage cables, which were used in the delivery check, in a set. In case where a resolver signal cable according to the present embodiment is employed in a direct drive motor system, the direct drive motor system can be greatly enhanced and stabilized in the positioning precision and can be greatly enhanced in the vibration reduction as well as in the noise reduction. Two cables of this type can be combined together into a set and such set can be employed in such a motor with a relative position detector and an absolute position detector as shown in FIG. 2.

By the way, the present embodiment is not limited to the number of cores and the number of phases of a resolver signal, provided that an imbalance between the exciting signal line and detect signal lines as well as an imbalance between the detect signal lines of multiple phases can be eliminated. Also, the present embodiment can also be applied to a twisted pair line and a twisted shield line. This similarly applies in the following embodiments as well which are to be discussed below.

Figure 13:
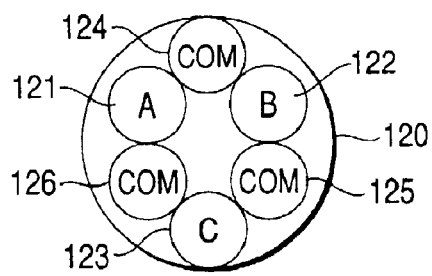
FIG. 13 is a section structure view of a resolver signal cable of a three-phase excitation three-phase output type.

Now, FIG. 13 is a section structure view of a resolver signal cable of a three-phase excitation three-phase output type used in the direct motor drive system of the present invention. In FIG. 13, reference character 120 designates a resolver signal cable, 121, 122 and 123 respectively stand for A phase, B phase and C phase detect signal lines, while 124, 125 and 126 respectively express the exciting signal lines (common signal lines) of the respective phases A, B and C, which forms a six-core structure.

The reason why the exciting signal line is divided into three lines is to facilitate the production of the cable. In the case of a structure shown in FIG. 12 as well, the cable production is possible but a space portion increases unfavorably. To form a twisted line, preferably, there may be used a structure shown in FIG. 13 because it has an advantage that the twisted line can be formed more easily. Therefore, since the portion of the exciting signal line to be divided into three lines can be limited to the cable portion thereof, it is not necessary to divide the portion of the exciting signal line (the portion thereof existing within the driver), which extends from an exciting signal source to the cable, into three lines. The signal lines are respectively twisted in the axial direction and, although a section structure shown in FIG. 13 does not exist exactly in every section thereof, on the average, the arrangements of the respective signal lines keep such position relationship as shown in FIG. 13. The signal lines 121, 122 and 123 of the respective phases are respectively situated at the vertices of a first equilateral triangle, while the exciting signal lines 124, 125 and 126 are respectively situated at the vertices of a second equilateral triangle. The first and second equilateral triangles are the same in shape and size, and the barycenters thereof respectively coincide with the central point of the resolver signal cable 120 and are symmetric with respect to the present central point. Due to the symmetric shape thereof, the distance between the signal lines 121 and 124, the distance between the signal lines 122 and 125, and the distance between the signal lines 123 and 126 are all equal; and also, the distance between the signal lines 121 and 122, the distance between the signal lines 122 and 123, and the distance between the signal lines 123 and 121 are all equal.

Accordingly, where the value of the electrostatic capacity between the signal lines 121 and 124 is expressed as $C_A$, the value of the electrostatic capacity between the signal lines 122 and 125 is expressed as $C_B$, the value of the electrostatic capacity between the signal lines 123 and 126 is expressed as $C_C$, the value of the electrostatic capacity between the signal lines 121 and 122 is expressed as $C_{AB}$, the value of the electrostatic capacity between the signal lines 122 and 123 is expressed as $C_{BC}$, and the value of the electrostatic capacity between the signal lines 123 and 121 is expressed as $C_{CA}$, there are obtained $C_A=C_B=C_C$ and $C_{AB}=C_{BC}=C_{CA}$, thereby being able to secure a balance in the values of the electrostatic capacity between the detect signal lines and exciting signal lines of the respective phases as well as in the values of the electrostatic capacity between the detect signal lines of the respective phases. According to the present embodiment, there can also be obtained the above-mentioned advantages (1)–(5). Thus, in case where a resolver signal cable according to the present embodiment is employed in a direct drive motor system, the direct drive motor system can be greatly enhanced and stabilized in the positioning precision and can be greatly enhanced in the vibration reduction as well as in the noise reduction. Two cables of this type can be combined together into a set and such set can be employed in such a motor with a relative position detector and an absolute position detector as shown in FIG. 2.

Figure 14:
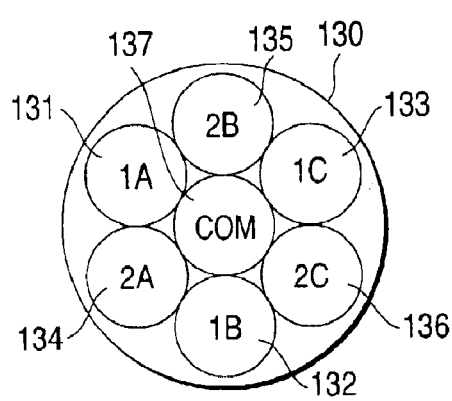
FIG. 14 is a section structure view of a resolver signal cable of a one-phase excitation three-phase output type.

Now, FIG. 14 is a section structure view of a resolver signal cable of a one-phase excitation three-phase output type. In the present embodiment, a resolver signal has two kinds of three-phase outputs. In FIG. 14, reference character 130 designates a resolver signal cable, 131, 132 and 133 respectively stand for first A phase, B phase and C phase detect signal lines, while 134, 135 and 136 respectively express second A phase, B phase and C phase detect signal lines, and 137 represents an exciting signal line (a common signal lines); that is, the embodiment 3 provides a seven-core structure. The resolver signal cable 30 can be used for connection to a motor with a relative position detector and an absolute position detector of the above type or for connection to two motors each having only the relative position detect function. The signal lines are respectively twisted in the axial direction and, although a section structure shown in FIG. 14 does not exist exactly in every section thereof, on the average, the arrangements of the respective signal lines keep such position relationship as shown in FIG. 14. The signal lines 131, 132 and 133 of the first A, B and C phases are respectively situated at the vertices of a first equilateral triangle, while the signal lines 134, 135 and 136 of the second A, B and C phases are respectively situated at the vertices of a second equilateral triangle. The first and second equilateral triangles are the same in shape and size, and the barycenters thereof respectively coincide with the central point of the resolver signal cable 130 are symmetric with respect to the present central point. Also, the central point of the resolver signal cable 130 is coincident with the central point of the exciting signal line 137. Due to the symmetric shape thereof, the distances between the signal lines 131–136 and exciting signal line 137 are all equal, while the distance between the signal lines 131 and 132, the distance between the signal lines 132 and 133, the distance between the signal lines 133 and 131, and the distance between the signal lines 134 and 135, the distance between the signal lines 135 and 136, and the distance between the signal lines 136 and 134 are all equal.

Accordingly, where the value of the electrostatic capacity between the signal lines 131 and 137 is expressed as $C_{1A}$, the value of the electrostatic capacity between the signal lines 132 and 137 is expressed as $C_{1B}$, the value of the electrostatic capacity between the signal lines 133 and 137 is expressed as $C_{1C}$, the value of the electrostatic capacity between the signal lines 134 and 137 is expressed as $C_{2A}$, the value of the electrostatic capacity between the signal lines 135 and 137 is expressed as $C_{2B}$, the value of the electrostatic capacity between the signal lines 136 and 137 is expressed as $C_{2C}$, the value of the electrostatic capacity between the signal lines 131 and 132 is expressed as $C_{1A1B}$, the value of the electrostatic capacity between the signal lines 132 and 133 is expressed as $C_{1B1C}$, the value of the electrostatic capacity between the signal lines 133 and 131 is expressed as $C_{1C1A}$, the value of the electrostatic capacity between the signal lines 134 and 135 is expressed as $C_{2A2B}$, the value of the electrostatic capacity between the signal lines 135 and 136 is expressed as $C_{2B2C}$, and the value of the electrostatic capacity between the signal lines 136 and 134 is expressed as $C_{2C2A}$, there are obtained $C_{1A}=C_{1B}=C_{1C}=C_{2A}=C_{2B}=C_{2C}$ and $C_{1A1B}=C_{1B1C}=C_{1C1A}=C_{2A2B}=C_{2B2C}=C_{2C2A}$. Thus, according to the present embodiment as well, there can obtained the above-mentioned advantages (1)–(5). Therefore, in case where a resolver signal cable according to the present embodiment is employed in a direct drive motor system, the direct drive motor system can be greatly enhanced and stabilized in the positioning precision and can be greatly enhanced in the vibration reduction as well as in the noise reduction.

Figure 15:
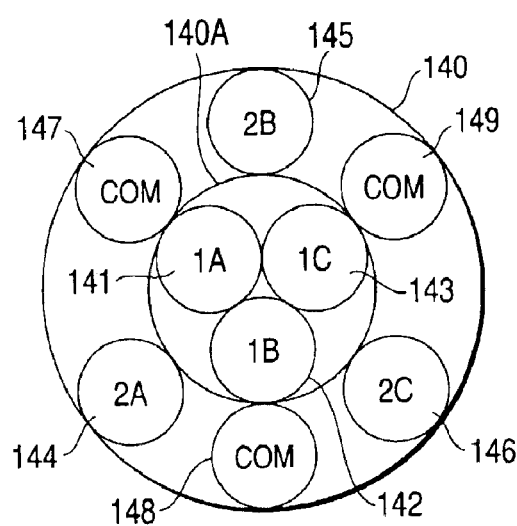
FIG. 15 is a section structure view of a resolver signal cable of a one-phase excitation three-phase output type.
Figure 16:
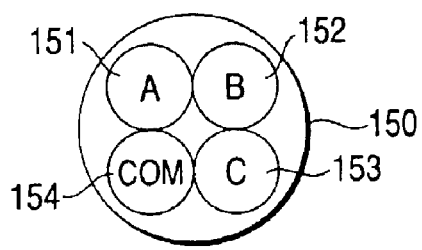
FIG. 16 is a section view of a resolver signal cable of a one-phase excitation three-phase output type.
Figure 17:
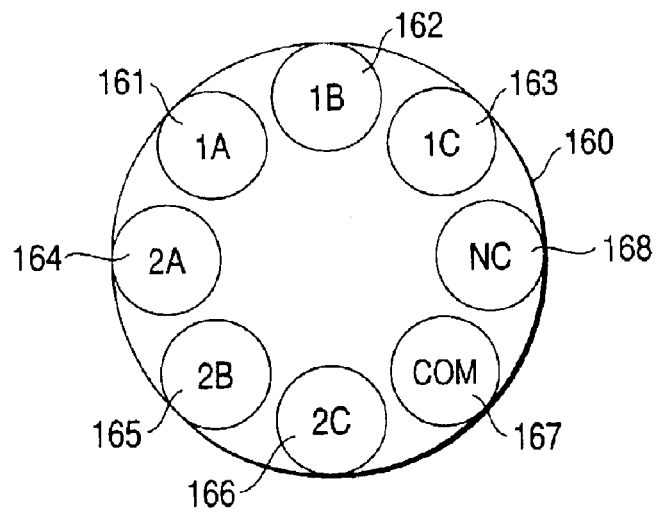
FIG. 17 is a section view of a resolver signal cable which can provide two kinds of three-phase outputs from a one-phase excitation.
Figure 18:
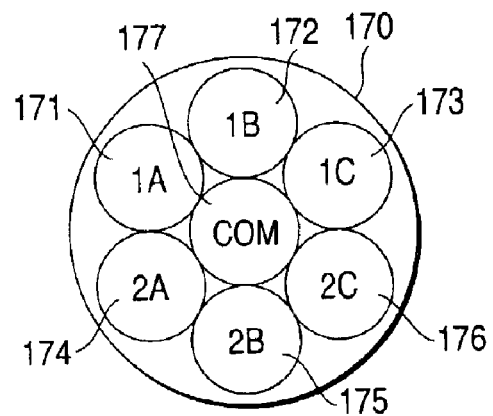
FIG. 18 is a section view of another structure of a resolver signal cable which provides two kinds of three-phase outputs for one phase excitation.

Now, FIG. 15 is a section structure view of a resolver signal cable of a one-phase excitation three-phase output type. In the present embodiment, a resolver signal has two kinds of three-phase outputs. In FIG. 15, reference character 140 designates a resolver signal cable, 141, 142 and 143 respectively stand for first A phase, B phase and C phase detect signal lines 144, 145 and 146 respectively express second A phase, B phase and C phase detect signal lines, and 147, 148 and 149 respectively represent exciting signal lines (common signal lines); and, the present embodiment provides a nine-core structure. The signal lines are respectively twisted in the axial direction and, the outside six signal lines are different in the twisting pitch or in the twisting direction from the inside three signal lines, although a section structure shown in FIG. 15 does not exist exactly in every section thereof, on the average, the arrangements of the respective signal lines keep such position relationship as shown in FIG. 15.

Since the exciting signal line is divided into three lines to thereby provide a structure shown in FIG. 15, there can be obtained not only an advantage which can be obtained in the embodiment but also an advantage that signal leakage (so called crosstalk) between two sets of detect signal lines can be prevented. Therefore, because the portion of the exciting signal line to be divided into three lines can be limited to the cable portion, there is eliminated the need to divide the portion of the exciting signal line (the portion thereof existing within the driver), which extends from an exciting signal source to the cable, into three lines.

The signal lines 141, 142 and 143 of the first A, B and C phases are respectively situated at the vertices of a first equilateral triangle, while the signal lines 144, 145 and 146 of the second A, B and C phases are respectively situated at the vertices of a second equilateral triangle. Also, the exciting signal lines 147, 148 and 149 are respectively at the vertices of a third equilateral triangle. The barycenters of the first, second and third equilateral triangles are respectively concentric with central point of the resolver signal cable 140, while the second and third equilateral triangles are the same in shape and size and are symmetric with respect to the present central point. Also, the detect signal lines 141, 142 and 143 are respectively inscribed in an inside circle 140A, while the detect signal lines 144, 145, 146 and exciting signal lines 147, 148, 149 are respectively circumscribed in the inside circle 140A. Due to the symmetry of the shapes thereof, the distance between the signal lines 141 and 147, the distance between the signal lines 142 and 148, and the distance between the signal lines 143 and 149 are all equal; and, the distance between the signal lines 147 and 144, the distance between the signal lines 149 and 145, and the distance between-the signal lines 148 and 146 are also equal. Also, the distance between the signal lines 141 and 142, the distance between the signal lines 142 and 143, and the distance between the signal lines 143 and 141 are all equal; and, the distance between the signal lines 1144 and 145, the distance between the signal lines 145 and 146, and the distance between the signal lines 146 and 144 are also equal.

Accordingly, where the value of the electrostatic capacity between the signal lines 147 and 141 is expressed as $C_{1A}$, the value of the electrostatic capacity between the signal lines 148 and 142 is expressed as $C_{1B}$, the value of the electrostatic capacity between the signal lines 149 and 143 is expressed as $C_{1C}$, the value of the electrostatic capacity between the signal lines 147 and 144 is expressed as $C_{2A}$, the value of the electrostatic capacity between the signal lines 149 and 145 is expressed as $C_{2B}$, the value of the electrostatic capacity between the signal lines 148 and 146 is expressed as $C_{2C}$, the value of the electrostatic capacity between the signal lines 141 and 142 is expressed as $C_{1A1B}$, the value of the electrostatic capacity between the signal lines 142 and 143 is expressed as $C_{1B1C}$, the value of the electrostatic capacity between the signal lines 143 and 141 is expressed as $C_{1C1A}$, the value of the electrostatic capacity between the signal lines 1144 and 145 is expressed as $C_{2A2B}$, the value of the electrostatic capacity between the signal lines 145 and 146 is expressed as $C_{2B2C}$, and the value of the electrostatic capacity between the signal lines 146 and 144 is expressed as $C_{2C2A}$, there are obtained $C_{1A}=C_{1B}=C_{1C}$, $C_{2A}=C_{2B}=C_{2C}$, $C_{1A1B}=C_{1B1C}=C_{1C1A}$, and $C_{2A2B}=C_{2B2C}=C_{2C2A}$. Therefore, according to the present embodiment as well, there can obtained the above-mentioned advantages (1)–(5). Thus, in case where a resolver signal cable according to the present embodiment is employed in a direct drive motor system, the direct drive motor system can be greatly enhanced and stabilized in the positioning precision and can be greatly enhanced in the vibration reduction as well as in the noise reduction.

According to the present invention, the circular-shaped stator includes a plurality of column-shaped magnetic poles disposed on the periphery of thereof in the circumferential direction thereof and stator coils former-wound on their respective coil bobbins are fitted with and mounted on the magnetic poles of the stator, thereby being able to position the stator coils freely, which makes it possible to fine adjust the positions of the coils of the resolver. Therefore, by reducing variations between direct drive motors, there can be provided a compatible direct drive motor system. Also, since the distances between the signal lines of the resolver cables as well as the distances between the signal lines and common lines can be set substantially uniform, the electrical interference of the resolver signals can be reduced, thereby being able to provide a compatible direct drive motor system.

According to the invention, there can be provided a synchronous resolver which not only can secure high-level absolute precision but also can realize compatibility between products.

According to the invention, there can be provided a resolver signal cable which can eliminate an imbalance in the values of the electrostatic capacity between the exciting signal line and detect signal lines and an imbalance in the values of the electrostatic capacity between the detect signal lines of the multiple phases and, when the length of the cable is changed or when a very long cable is used, is able to maintain the performance of signals flowing through the cable.

What is claimed is:

1. A synchronous resolver, comprising:
   a stator including a plurality of stator poles disposed at regular intervals along the circumferential direction of a ring-shaped stator base portion, the stator poles comprise a plurality of phases;
   coil bobbins with former-wound stator coils therearound are respectively fitted with and mounted on associated ones of the stator polesmovably therealong; and,
   a rotor shiftable in angle with respect to the stator to thereby vary a reluctance component in a gap existing between the stator and the rotor,
   wherein via the coil bobbins, the stator coils are set in position for phase balancing thereof.

2. A synchronous resolver as set forth in claim 1, further comprising a collar, for preventing the coil bobbin against removal, connected to the leading end of the stator pole.

3. A synchronous resolver as set forth in claim 1, wherein the coil bobbin includes a mounting position loosening preventive mechanism.

4. A resolver cable with a multicore structure comprising:
   at lest one exciting signal line for supplying an exciting signal to a resolver apparatus; and
   a plurality of detect signal lines for transmitting one polyphase resolver signal output from the resolver apparatus,
   wherein the plurality of detect signal lines and the at least one exciting signal line are disposed in such a manner that the average values of the electrostatic capacity between the respective ones of the plurality of detect signal lines and the at least one exciting signal line are substantially equal and the average values of the electrostatic capacity between the mutually adjoining ones of the detect signal lines are substantially equal.

5. A resolver cable with a multicore structure comprising:
   at least one exciting signal line for supplying an exciting signal to a resolver apparatus and
   a plurality of detect signal lines for transmitting at least two polyphase resolver signals output from the resolver apparatus,
   wherein the plurality of detect signal lines and the at least one exciting signal line are disposed in such a manner that the average values of the electrostatic capacity between the respective ones of the plurality of detect signal lines and the at least one exciting signal line are substantially equal and the average values of the electrostatic capacity between the mutually adjoining ones of the detect signal lines are substantially equal.

6. A direct drive motor system, comprising:
   a direct drive motor including a homopolar resolver and a multipolar resolver for outputting polyphase resolver signals from the respective resolvers, the homopolar resolver being structured such that, due to rotation of a first rotor, the fundamental wave component of the reluctance in a gap between the first rotor and a first circular-shaped stator provides one cycle, the multipolar resolver being structured such that, due to rotation of a second rotor, the fundamental wave component of the reluctance in a gap between the second rotor and a second circular-shaped stator provides a plurality of cycles;

a drive unit, in accordance with the polyphase resolver signals output from the direct drive motor, for outputting an exciting current for driving the direct drive motor; and a resolver cable for transmitting the polyphase resolver signals output from the direct drive motor to the drive unit, wherein the homopolar resolver and the multipolar resolver of the direct drive motor are constructed by synchronous resolvers each comprising:

a stator including a plurality of stator poles disposed at regular intervals along the circumferential direction of a ring-shaped stator base portion, the stator poles comprise a plurality of phases;

coil bobbins with former-wound stator coils therearound are respectively fitted with and mounted on associated ones of the stator poles; and, a rotor shiftable in angle with respect to the stator to thereby vary a reluctance component in a gap existing between the stator and the rotor, wherein via the coil bobbins, the stator coils are set in position for phase balancing thereof.

7. The direct drive motor system as set forth in claim 6, wherein the resolver cable comprises at least one exciting signal line for supplying an exciting signal to a resolver apparatus and a plurality of detect signal lines for transmitting a polyphase resolver signal output from the resolver apparatus, wherein the plurality of detect signal lines and the at least one exciting signal line are disposed in such a manner that the average values of the electrostatic capacity between the respective ones of the plurality of detect signal lines, and the at least one exciting signal line are substantially equal and the average values of the electrostatic capacity between the mutually adjoining ones of the detect signal lines are substantially equal, and wherein the resolver cables are connected to each of the homopolar resolver and the multipolar resolver.

8. The direct drive motor system as set forth in claim 6, wherein the resolver cable is constructed by one resolver cable as set forth in claim 5, and the resolver cable is connected to both of the the homopolar resolver and the multipolar resolver.

9. The direct drive motor system as set forth in claim 7, wherein the resolver cable is structured such that the distances between the detect signal lines of the respective phases of the polyphase resolver signals as well as the distances between the respective detect signal lines and the at lest one exciting signal line are set substantially uniform.

10. The direct drive motor system as set forth in claim 8, wherein the resolver cable is structured such that the distances between the detect signal lines of the respective phases of the polyphase resolver signals as well as the distances between the respective detect signal lines and the at least one exciting signal line are set substantially uniform.

11. The direct drive motor system as set forth in claim 6, wherein for each synchronous resolver, said coil bobbins are disposed on said magnetic stator poles so as to be movable therealong.

* * * * *